UNITED STATES PATENT OFFICE.

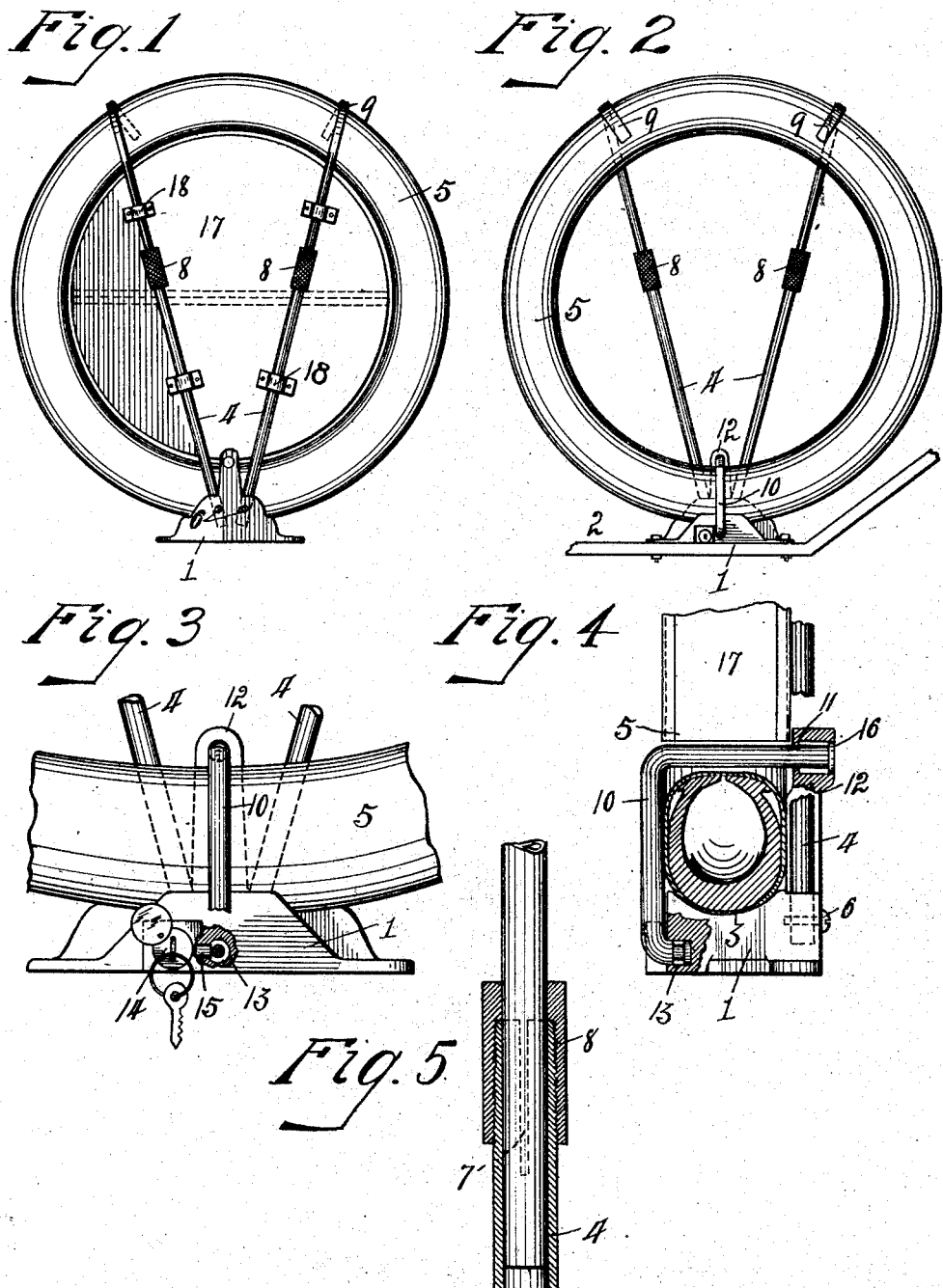

ARCHIBALD U. CAMPBELL, OF TOLEDO, OHIO.

COMBINED TIRE AND TRUNK HOLDER FOR AUTOMOBILES.

1,015,422. Specification of Letters Patent. Patented Jan. 23, 1912.

Application filed June 29, 1911. Serial No. 636,001.

*To all whom it may concern:*

Be it known that I, ARCHIBALD U. CAMPBELL, a citizen of the United States, and a resident of Toledo, in the county of Lucas and State of Ohio, have invented a certain new and useful Combined Tire and Trunk Holder for Automobiles; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to automobile accessories, and particularly to tire and trunk holders.

The object of my invention is the provision of an improved automobile attachment of this character, which is simple, strong and durable in its construction, and adapted to rigidly and securely carry both a tire and a trunk in a manner to permit either to be removed therefrom without interfering with the other, thus enhancing the practicability and commercial value of devices of this class.

A further object of my invention is the provision of a tire holder of this character, which is easily and quickly adjustable to suit tires of different sizes, and is provided with improved means for locking a tire or tires thereto.

The invention is fully described in the following specification, and while in its broader aspect it is capable of embodiment in numerous forms, a preferred embodiment thereof is illustrated in the accompanying drawings, in which,—

Figure 1 is an inner side elevation of my invention with a tire and trunk secured thereto; Fig. 2 is an outer side elevation of the same with the trunk removed; Fig. 3 is an enlarged outer side elevation of the base portion of the holder with a portion broken away; Fig. 4 is an enlarged end elevation of the same with portions broken away and a tire in section therein, and Fig. 5 is an enlarged detail of the gripping portion of one of the adjustable tire holding arms of the invention.

Referring to the drawings, 1 designates the base-block of my invention which is bolted or otherwise securely mounted upon the foot or running board 2 of an automobile. The base-block 1, which is shown in the present instance as being adapted for the holding of a single tire, is preferably provided on its top with a longitudinally extending concaved tire seat 3 upon which the lower portion of a tire carried by the holder is intended to rest, as indicated.

Rising from the inner side edge of the block 1 in diverging planes is a pair of tire holding arms 4, each preferably comprising two telescopically adjustable sections which provide for the longitudinal adjustment of such arms to adapt the holder to receive and hold tires 5 of different sizes or diameters. The lower sections of the arms 4 are shown as seating within sockets provided therefor in the base-block and as being secured against removal therefrom by screws 6, and have their upper ends provided with one or more longitudinal slits 7 to facilitate a compression of such end about the upper section of the arm to tightly grip the same. A nut 8 having a tapered thread is mounted on the upper end of the lower section of each arm and is adapted upon a turning thereof in one direction to coöperate with such end to tightly grip the upper arm section, as is apparent. The upper ends of the upper arm sections are bent in hook shape, as shown at 9, to adapt them to engage over the upper portion of a tire to hold it to its seat on the base-block, as indicated.

In order to securely lock a tire to the base-block 1 and prevent an unauthorized removal thereof, I provide an angled lock-bar 10, which is shown as being of substantially U-shaped construction with one leg longer than the other and extending over the lower portion of the tire with its end projected within an aperture 11 in a lug 12 which rises from the inner side edge of the base 1, and with its short leg removably fitting within a registering socket 13 in the outer side of the base 1. The loop portion of the bar preferably engages the associated side portion of a tire and coöperates with the base lug 12 to prevent lateral movements thereof. The bar 10 is retained in locked engagement with the base block 1 in the present instance by a key controlled lock 14 which has a tumbler 15 adapted to engage a registering notch or recess in the short leg of the lock bar when such leg is inserted within its base socket as is apparent. In order to prevent a complete removal of the lock-bar 10 from the baseblock when unlocked its upper leg is mounted at its end for pivotal movements within the lug socket 11 and is shouldered, as at 16, to adapt it to coact with a shouldered portion of such socket to limit the outward movements of the lock bar relative thereto. It is thus apparent that upon a releasing of the lock from engagement with the notched end of the lock-bar 10 such bar may be moved outward a sufficient distance to withdraw its short leg from within the socket 13 and then swung upwardly to permit a removal of a tire from the holder.

The positioning of the tire holding arms 4 at one side of the tire provides a free space within the tire for the placing of an auto-trunk 17, which trunk is preferably circular in form and of suitable size to fit freely within the tire 5. The trunk 17 is securely held within the tire free from contact therewith by the provision on its rear side of straps or loops 18, which encircle the arms 4 of the holder, as shown in Fig. 1.

I wish it understood that while I have shown and described a single tire carrying type of holder it may be adapted for the carrying of two or more tires by simply broadening the base block 1 for such purpose; and also that the invention is not limited to any specific construction or arrangement of the parts except in so far as such limitations are specified in the claims.

Having thus described my invention, what I claim as new and desire to secure by Letters Patent, is,—

1. In a tire holder, a base-block having a lug rising from the inner side thereof and provided with a laterally projecting socket, an angled lock bar having an end mounted for pivotal and reciprocal movements in said socket and extending outwardly and downwardly from said lug to coöperate with the base and lug to embrace a tire, and means for locking the outer lower end of said bar to the base block.

2. In a tire holder, a base-block having a part rising from the inner side thereof and provided with a socket, a lock bar mounted for reciprocal movements in said socket and projecting outwardly and downwardly therefrom with its lower end turned inwardly, and means carried by the base block and operable to lock said bar against movement relative to the base block.

3. In a tire holder, a base block having a tire seat on its top and a part rising from one side of such seat and provided with a laterally projecting socket, said base block also having a socket in the opposite side thereof from which said part projects, and an angled bar having an end mounted for reciprocal and pivotal movements in said part socket and having an end projected into said base-block socket to coöperate with said block and part to embrace a tire, and means carried by the base block for locking said bar against movement relative to the block.

4. In an apparatus of the class described, a base-block forming a tire rest and having a part rising from the inner side thereof, adjustable telescoping arms rising from the inner side of the base-block and adapted to engage the upper portion of a tire in opposition to said block, an angled lock-bar for coöperating with the base-block to embrace a tire and having one end mounted for reciprocal movements in said base-block part, and means for locking the other end of the lock-bar to the base-block, substantially as described.

In testimony whereof, I have hereunto signed my name to this specification in the presence of two subscribing witnesses.

ARCHIBALD U. CAMPBELL.

Witnesses:
S. T. KLOTZ,
WILBER A. OWEN.

Copies of this patent may be obtained for five cents each, by addressing the "Commissioner of Patents, Washington, D. C."